United States Patent
Dodis et al.

(10) Patent No.: US 10,914,260 B2
(45) Date of Patent: Feb. 9, 2021

(54) METHOD AND SYSTEMS FOR FUEL INJECTION CONTROL ON A HIGH-PRESSURE COMMON RAIL ENGINE

(71) Applicant: Transportation IP Holdings, LLP, Norwalk, CT (US)

(72) Inventors: Lindsey Dodis, Erie, PA (US); Michael Mangus, Raleigh, NC (US); Pisey Leute, Lawrence Park, PA (US); Luke Henry, Lawrence Park, PA (US); James Mischler, Lawrence Park, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 1 day.

(21) Appl. No.: 16/281,761

(22) Filed: Feb. 21, 2019

(65) Prior Publication Data

US 2020/0271068 A1 Aug. 27, 2020

(51) Int. Cl.
*F02D 41/14* (2006.01)
*F02D 41/20* (2006.01)
*F02D 41/38* (2006.01)

(52) U.S. Cl.
CPC ......... *F02D 41/1401* (2013.01); *F02D 41/20* (2013.01); *F02D 41/3809* (2013.01); *F02D 2041/1433* (2013.01); *F02D 2041/2055* (2013.01); *F02D 2200/0602* (2013.01); *F02D 2200/0614* (2013.01)

(58) Field of Classification Search
CPC .. F02D 41/1401; F02D 41/20; F02D 41/3809; F02D 2041/1433; F02D 2041/2055; F02D 2200/0614; F02D 2200/0602
See application file for complete search history.

(56) References Cited

U.S. PATENT DOCUMENTS

| | | | | |
|---|---|---|---|---|
| 4,359,032 A * | 11/1982 | Ohie | ...................... | F02D 41/345 123/458 |
| 4,543,929 A * | 10/1985 | Kataoka | .............. | F02B 23/0639 123/263 |
| 5,718,203 A * | 2/1998 | Shimada | ................ | F02D 35/024 123/305 |
| 5,755,208 A * | 5/1998 | Bombarda | .......... | F02D 41/1401 123/478 |
| 5,950,598 A * | 9/1999 | Wenzlawski | .......... | F02D 35/023 123/435 |
| 6,961,651 B2 * | 11/2005 | Oshima | ............... | F02D 41/3836 123/456 |

(Continued)

*Primary Examiner* — Joseph J Dallo
(74) *Attorney, Agent, or Firm* — McCoy Russell LLP

(57) ABSTRACT

Various methods and systems are provided for indexing an injector map and subsequently controlling fuel injection to an engine. In one embodiment, a method for the engine includes injecting fuel via activating an injector for a determined activation time, the activation time determined based on a commanded fuel value and a function of a modified pressure difference across an orifice of a nozzle of the injector, where the modified pressure difference is based on a difference between a rail pressure and peak cylinder pressure, the peak cylinder pressure scaled by a function of engine speed and injection timing and the pressure difference offset by a correction factor.

20 Claims, 7 Drawing Sheets

(56) References Cited

U.S. PATENT DOCUMENTS

| | | | | |
|---|---|---|---|---|
| 7,520,265 | B2* | 4/2009 | Ishizuka | F02D 35/023 |
| | | | | 123/435 |
| 8,095,294 | B1* | 1/2012 | Griffiths | F02D 35/024 |
| | | | | 701/103 |
| 9,228,525 | B2 | 1/2016 | Nistler et al. | |
| 10,401,398 | B2* | 9/2019 | Shahroudi | F02D 41/248 |
| 2007/0144492 | A1* | 6/2007 | Sugiyama | F02D 41/2416 |
| | | | | 123/480 |
| 2010/0292911 | A1* | 11/2010 | Cologna | F02D 41/401 |
| | | | | 701/104 |
| 2014/0330504 | A1* | 11/2014 | Nistler | F02D 41/2416 |
| | | | | 701/104 |

* cited by examiner

FIG. 3

Table 300 (304):

| Fuel Value (mm³/stroke) | Fuel Rail Pressure (FRP) | | | |
|---|---|---|---|---|
| | 600 | 1000 | 1200 | ... |
| 0 | 0.6 | 0.5 | 0.4 | ... |
| 50 | 1.0 | 0.8 _314_ | 0.7 _316_ | ... |
| 100 | 1.2 | 0.9 _318_ | 0.8 _320_ | ... |
| 150 | 1.5 | 1.1 | 1.0 | ... |
| 200 | 1.8 | 1.2 | 1.1 | ... |
| ⋮ | ... | ... | ... | ... |

Table 302:

| Fuel Value (mm³/stroke) | SQRT(RP − PCP*f1(x,y)−f2(z)) | | | |
|---|---|---|---|---|
| | √600−F | √1000−F | √1200−F | ... |
| 0 | 0.6 | 0.5 | 0.4 | ... |
| 50 | 1.0 | 0.8 | 0.7 | ... |
| 100 | 1.2 | 0.9 | 0.8 | ... |
| 150 | 1.5 | 1.1 | 1.0 | ... |
| 200 | 1.8 | 1.2 | 1.1 | ... |
| ⋮ | ... | ... | ... | ... |

METHOD AND SYSTEMS FOR FUEL INJECTION CONTROL ON A HIGH-PRESSURE COMMON RAIL ENGINE

BACKGROUND

Technical Field

Embodiments of the subject matter disclosed herein relate to methods and systems for controlling a high-pressure common rail fuel system of an engine.

Discussion of Art

Vehicles, such as rail vehicles, include power sources, such as diesel engines or dual fuel engines that utilize both diesel fuel and another type of fuel, such as natural gas. In some vehicles, diesel fuel is provided to the diesel or dual fuel engine by a common rail fuel system. In the common fuel rail system, fuel injectors inject fuel (e.g., diesel fuel) from the common fuel rail to cylinders of the engine for combustion. Some engine systems may use an injector map stored within a memory of a controller to determine a fuel injector activation output. In one example, the fuel injector activation output may include an injector activation time, and/or an amount of time the injectors are injecting fuel into the engine cylinders. The injector map may include a table of injector activation data with each injector activation time corresponding to a fuel rail pressure and a fuel value, or quantity of fuel injected by a single fuel injector stroke. Thus, by using the injector map, an engine controller may output an injector activation time for a given fuel value and measured fuel rail pressure. Fuel injection may then be adjusted, based on the determined injector activation time, to deliver the desired amount of fuel to the engine cylinders.

BRIEF DESCRIPTION

In one embodiment, a non-transitory computer readable storage medium with memory includes: fuel injector activation data indexed in the memory according to two input parameters; instructions for determining a modified pressure difference value across a nozzle orifice of a fuel injector based on determined pressures upstream and downstream of the nozzle orifice, engine speed, injection timing, and a modified pressure difference function; and instructions for generating a fuel injector activation output by interpolating among the indexed fuel injector activation data with the modified pressure difference value as a first of the two input parameters.

BRIEF DESCRIPTION OF THE DRAWINGS

FIG. 3 shows fuel injector tables according to an embodiment of the invention.

DETAILED DESCRIPTION

Figure 1:
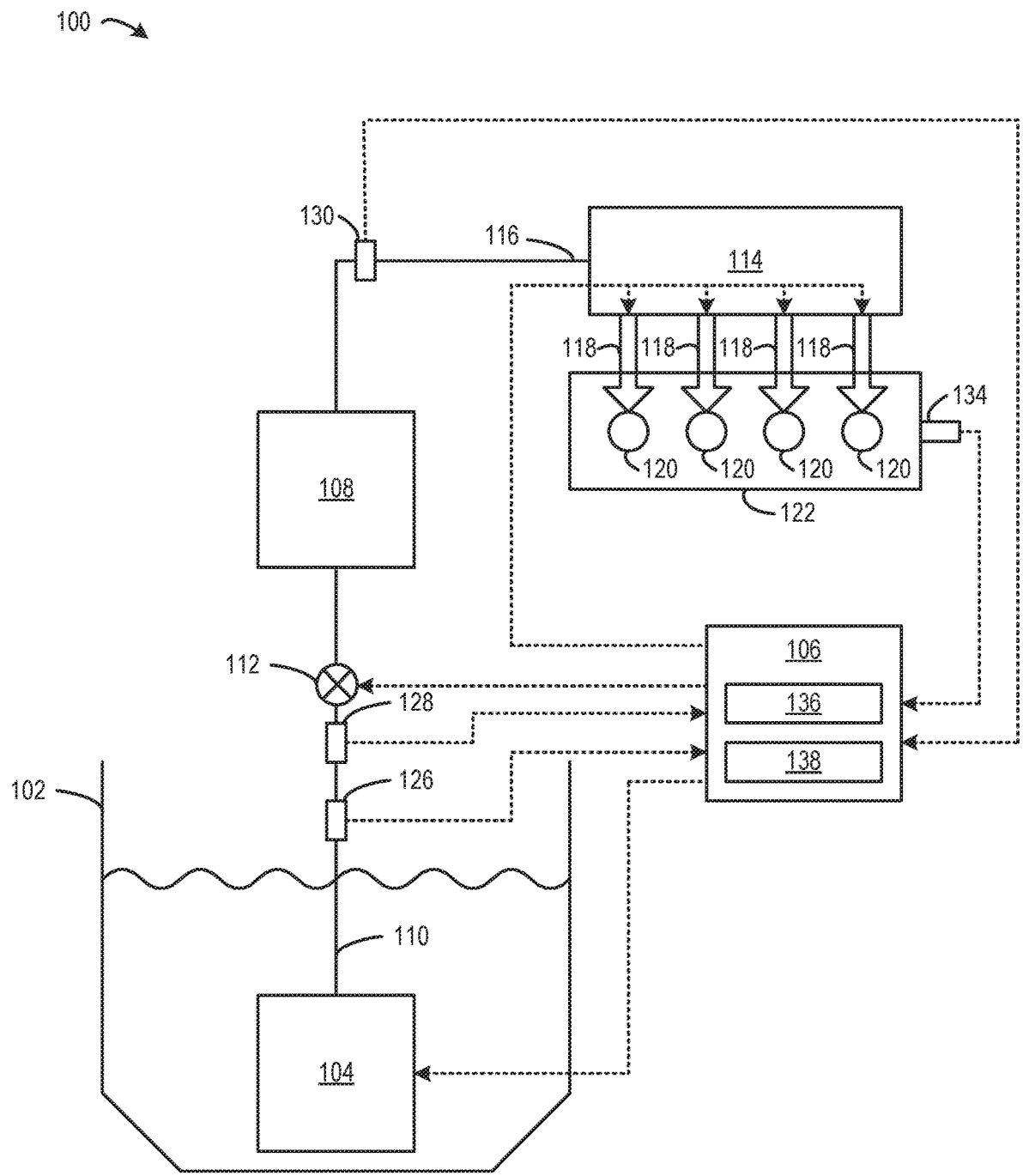
FIG. 1 shows a schematic diagram of a common fuel rail system according to an embodiment of the invention.

The following description relates to various embodiments for indexing an injector map and subsequently controlling fuel injection to an engine. An amount of fuel injected into an engine cylinder by a fuel injector may be based on a fuel rail pressure and an injector activation time (e.g., an amount of time the injector injects fuel). Further, fuel injection data for controlling fuel injection may be stored within a memory of an engine controller. For example, the fuel injection data may include fuel injection activation times for various fuel values and fuel rail pressures. In other words, the fuel injection activation data may be indexed by fuel rail pressure and a fuel value. The engine controller may then determine a fuel injection activation time by interpolating among the injector table data based on a determined fuel rail pressure (e.g., measured pressure) and desired fuel value. In this way, the fuel injectors may be activated based on the resulting fuel injector activation time in order to deliver a desired amount of fuel at a given fuel rail pressure.

However, indexing the injector table in this way may lead to linear interpolation inaccuracies due to a non-linear relationship between the injector data, thereby increasing fuel injector activation time error. This may in turn decrease fuel consumption efficiency and increase emissions variation.

By making the relationship between injector activation data more linear, interpolation inaccuracies may be reduced, thereby increasing fuel injector activation time accuracy. For example, the injector table may be indexed by a modified pressure instead of the fuel rail pressure alone. The modified pressure may be based on a modified pressure function and a determined or measured fuel rail pressure. As such, the modified pressure function may transform the fuel injector activation data stored in the injector table to be more linear between cells of the injector table. Interpolation between such transformed data may reduce interpolation error relative to untransformed data, thereby resulting in a more accurate fuel injector activation time and more accurate control of fuel injection to the engine.

The inventors herein have also recognized that the fuel flow model represented in the injector tables discussed above may be susceptible to error at different operating conditions experienced by the engine. Specifically, the inventors have recognized that on-engine (e.g., during engine operation) pressure conditions around the nozzle orifice of the injector are more dynamic and generally not the same as pressure conditions around the same nozzle orifice on a test bench, from which the typical injector maps are created. Thus, the modified pressure function described above may be further modified to account for physical changes in engine operation that drive fuel flow model error. For example, the modified pressure function (referred to herein as the modified pressure difference function) may account for changes in fuel rail supply pressure as well as the pressures in the engine cylinder as a function of injection timing, engine speed, injection length, dual fuel gas quantities in the cylinder (e.g., when the engine is a dual fuel engine combusting both diesel fuel and a secondary fuel, such as natural gas), and the like.

Figure 2:
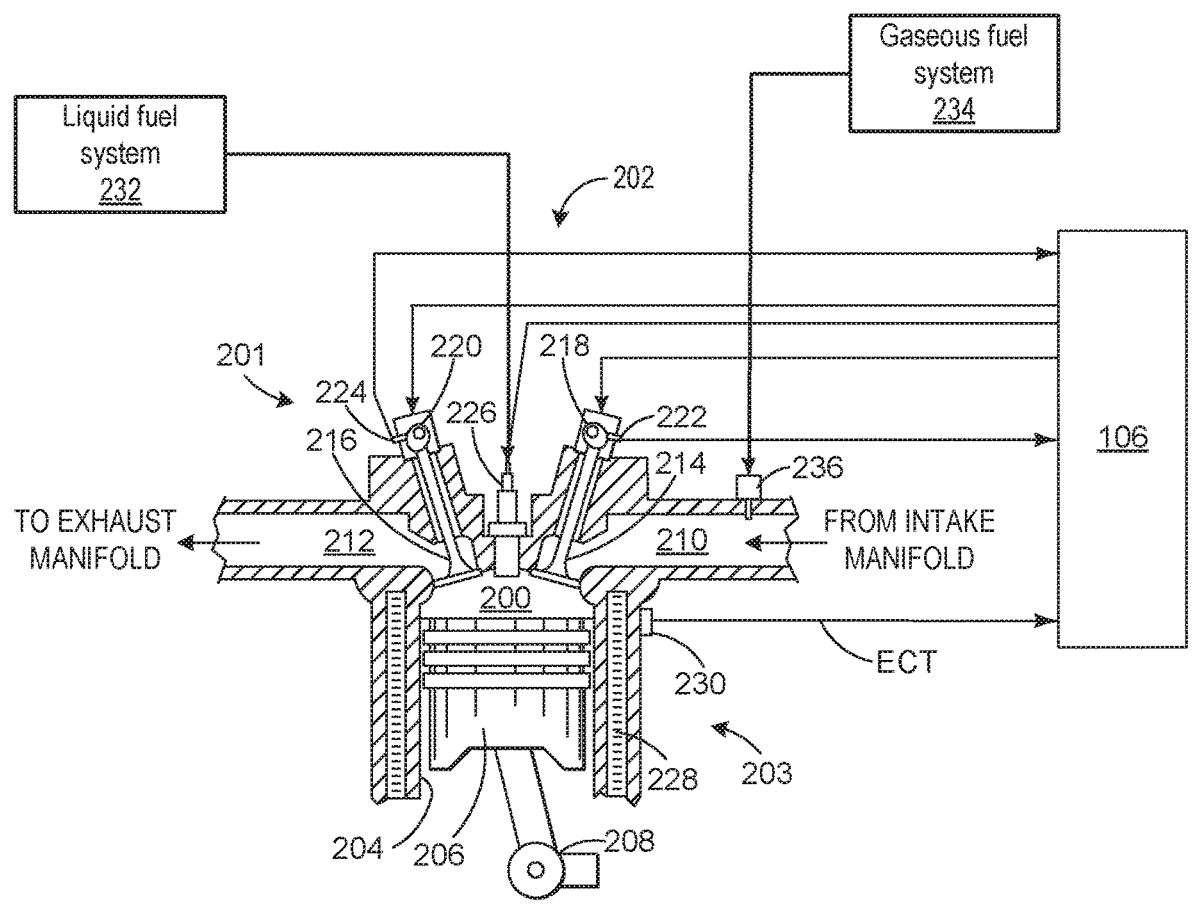
FIG. 2 shows a schematic diagram of an example cylinder of a multi-fuel engine according to an embodiment of the invention.
Figure 9:
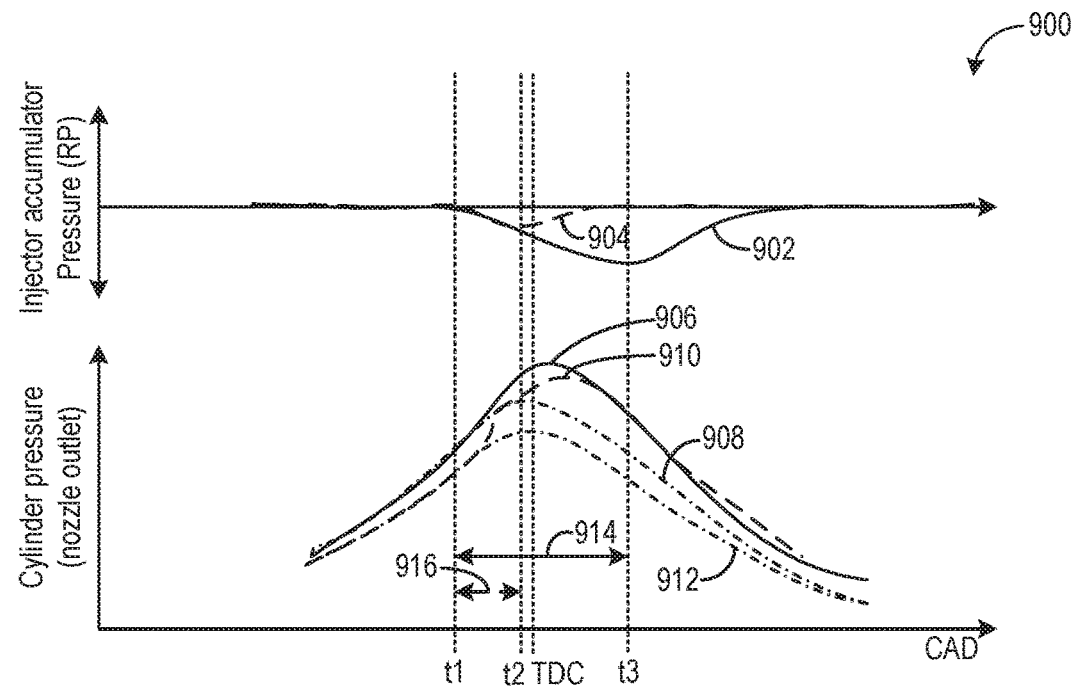
Figure 10:
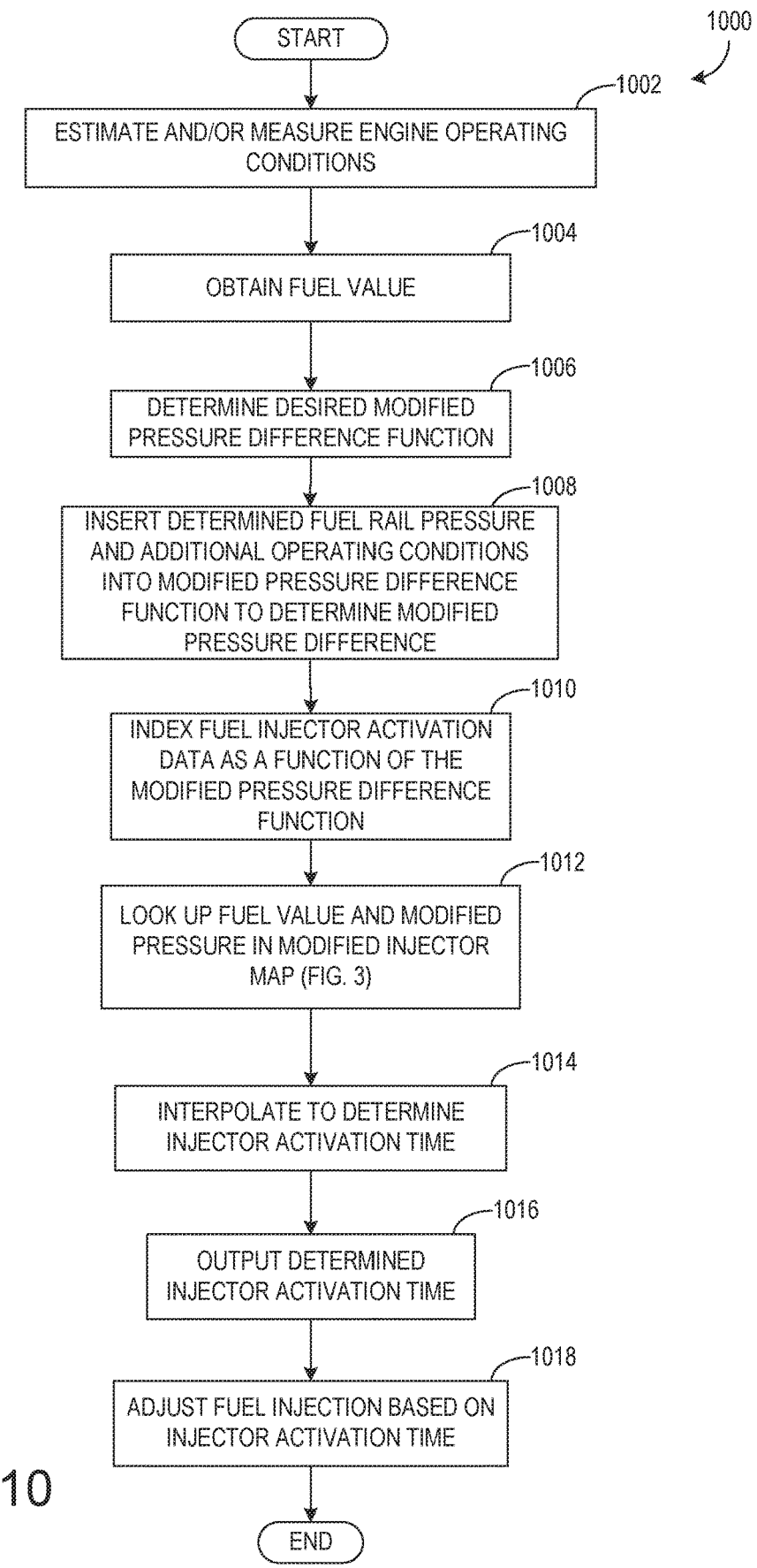
FIG. 10 shows a method for adjusting fuel injection to the engine based on an injector activation time according to an embodiment of the invention.

FIG. 1 shows an example common rail fuel system of an engine, such as the engine of FIG. 2. The common rail fuel system may include a plurality of injectors for injecting fuel, such as diesel fuel. As shown in FIG. 2, the engine may either be a diesel-only engine (e.g., injecting only liquid, diesel fuel) or a dual fuel engine which injects both liquid fuel via the common rail fuel system and a secondary, gaseous fuel, such as natural gas. Activation data for the plurality of injectors may be stored in memory of an engine controller as a map, such as the maps shown in FIG. 3. In order to account for fuel flow model errors of an injector seen on-board an engine, during engine operation, the injector activation data may be indexed in the injector map according to a modified pressure difference function that is based on a pressure difference across an orifice of the nozzle of the injector, a function of injection timing and engine speed, and a correction factor that accounts for differences in pressures seen across the injector on-board the engine vs. on the test bench (e.g., during injector testing off-board the engine). The graphs presented in FIGS. 4-9 illustrate the changes in pressures upstream and downstream of the injector nozzle orifice seen for different injection parameters, including for single vs. multiple injections, for different injection timings, for different gaseous fuel substitution ratios, and the like. FIG. 10 presents a method for indexing the stored fuel injector activation data according to the modified pressure difference function and subsequently adjusting fuel injection based on an injector activation time determined from an injector map including the indexed fuel injector activation data.

The functions for the modified pressure difference across the orifice of the injector discussed herein may allow for more accurate, high-substitution ratio operation in a dual fuel engine (e.g., high ratio of natural gas to total fuel which includes natural gas and diesel fuel) as well as accurate and efficient use of post-injections on a diesel fuel engine for reduced emissions and fuel consumption.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHVs). For clarity of illustration, a locomotive is provided as an example of a mobile platform supporting a system incorporating an embodiment of the invention.

Before further discussion of the approach for indexing an injector map and subsequently controlling fuel injection to an engine, an example of a fuel system for an engine is disclosed. For example, FIG. 1 shows a block diagram of a common rail fuel system (CRS) 100 for an engine of a vehicle, such as a rail vehicle. Liquid fuel, such as diesel fuel, is sourced or stored in a fuel tank 102. A low-pressure fuel pump 104 is in fluid communication with the fuel tank 102. In the embodiment shown in FIG. 1, the low-pressure fuel pump 104 is disposed inside of the fuel tank 102 and can be immersed below the liquid fuel level. In alternative embodiments, the low-pressure fuel pump may be coupled to the outside of the fuel tank and pump fuel through a suction device. Operation of the low-pressure fuel pump 104 is regulated by a controller 106.

Liquid fuel is pumped by the low-pressure fuel pump 104 from the fuel tank 102 to a high-pressure fuel pump 108 through a conduit 110. A valve 112 is disposed in the conduit 110 and regulates fuel flow through the conduit 110. For example, the valve 112 is an inlet metering valve (IMV). The IMV 112 is disposed upstream of the high-pressure fuel pump 108 to adjust a flow rate of fuel that is provided to the high-pressure fuel pump 108 and further to a common fuel rail 114 for distribution to a plurality of fuel injectors 118 for fuel injection. For example, the IMV 112 may be a solenoid valve, opening and closing of which is regulated by the controller 106. In other words, the controller 106 commands the IMV to be fully closed, fully open, or a position in between fully closed and fully opened in order to control fuel flow to the high-pressure fuel pump 108 to a commanded fuel flow rate. During operation of the vehicle, the IMV 112 is adjusted to meter fuel based on operating conditions, and during at least some conditions may be at least partially open. It is to be understood that the valve is merely one example of a control device for metering fuel and any suitable control element may be employed without departing from the scope of this disclosure. For example, a position or state of the IMV may be electrically controlled by controlling an IMV electrical current. As another example, a position or state of the IMV may be mechanically controlled by controlling a servo motor that adjusts the IMV.

The high-pressure fuel pump 108 increases fuel pressure from a lower pressure to a higher pressure. The high-pressure fuel pump 108 is fluidly coupled with the common fuel rail 114. The high-pressure fuel pump 108 delivers fuel to the common fuel rail 114 through a conduit 116. A plurality of fuel injectors 118 are in fluid communication with the common fuel rail 114. Each of the plurality of fuel injectors 118 delivers fuel to one of a plurality of engine cylinders 120 in an engine 122. Fuel is combusted in the plurality of engine cylinders 120 to provide power to the vehicle through an alternator and traction motors, for example. Operation of the plurality of fuel injectors 118 is regulated by the controller 106. In the embodiment of FIG. 1, the engine 122 includes four fuel injectors and four engine cylinders. In alternate embodiments, more or fewer fuel injectors and engine cylinders can be included in the engine.

Fuel pumped from the fuel tank 102 to an inlet of the IMV 112 by the low-pressure fuel pump 104 may operate at what is referred to as a lower fuel pressure or engine fuel pressure. Correspondingly, components of the CRS 100 which are upstream of the high-pressure fuel pump 108 operate in a lower fuel pressure or engine fuel pressure region. On the other hand, the high-pressure fuel pump 108 may pump fuel from the lower fuel pressure to a higher fuel pressure or rail fuel pressure. Correspondingly, components of the CRS 100 which are downstream of the high-pressure fuel pump 108 are in a higher-fuel pressure or rail fuel pressure region of the CRS 100.

A fuel pressure in the lower fuel pressure region is measured by a pressure sensor 126 that is positioned in the conduit 110. The pressure sensor 126 sends a pressure signal to the controller 106. In an alternative application, the pressure sensor 126 is in fluid communication with an outlet of the low-pressure fuel pump 104. A fuel temperature in the lower fuel pressure region is measured by a temperature sensor 128 that is positioned in conduit 110. The temperature sensor 128 sends a temperature signal to the controller 106.

A fuel pressure in the higher fuel pressure region is measured by a pressure sensor 130 that is positioned in the conduit 116. The pressure sensor 130 sends a pressure signal to the controller 106. The controller 106 uses this pressure signal to determine a rail pressure of fuel (e.g., FRP) in the common fuel rail. As such, the fuel rail pressure (FRP) is provided to the controller 106 by the pressure sensor 130. In an alternative application, the pressure sensor 130 is in fluid communication with an outlet of the high-pressure fuel pump 108. Note that in some applications various operating parameters may be generally determined or derived indirectly in addition to or as opposed to being measured directly.

In addition to the sensors mentioned above, the controller 106 receives various signals from a plurality of engine sensors 134 coupled to the engine 122 that may be used for assessment of fuel control health and associated engine operation. For example, the controller 106 receives sensor signals indicative of air-fuel ratio, engine speed, engine load, engine temperature, ambient temperature, fuel value, a number of cylinders actively combusting fuel, and the like. In the illustrated implementation, the controller 106 is a computing device, such as microcomputer that includes a processor unit 136, non-transitory computer-readable storage medium device 138, input/output ports, memory, and a data bus. The computer-readable storage medium 138 included in the controller 106 is programmable with computer readable data representing instructions executable by the processor for performing the control routines and methods described below as well as other variants that are not specifically listed.

The controller 106 is operable to adjust various actuators in the CRS 100 based on different operating parameters received or derived from different signals received from the various sensors, to dynamically assess the health of the CRS and control operation of the engine based on the assessment. For example, in an embodiment, the controller 106 is operable to adjust fuel injection to the engine. Specifically, the controller may adjust fuel injection timing of one or more fuel injectors based on a determined injector activation time. This may include adjusting a pulse width modulation signal to command the plurality of fuel injectors to inject fuel for a duration.

The controller 106 is also operable to generate a fuel injector activation output, such as the fuel injector activation time, based on operating conditions of the CRS and stored fuel injector activation data. The fuel injector activation data may be stored within the memory of the computer-readable storage medium of the controller. In one example, the fuel injector activation data may be stored within an injector table or map, such as the first injector table 300 or the second injector table 302 shown in FIG. 3.

FIG. 2 depicts an embodiment of a combustion chamber, or cylinder 200, of a multi-cylinder internal combustion engine 202, such as an engine including the common rail fuel system described above with reference to FIG. 1. The cylinder may be defined by a cylinder head 201, housing the intake and exhaust valves and liquid fuel injector, described below, and a cylinder block 203.

The engine may be controlled at least partially by a control system including controller 106 which may be in further communication with a vehicle system. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, etc. Correspondingly, the controller may control an engine system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail, as described above with reference to FIG. 1. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, fueling to the cylinder may be controlled by the controller actuating the fuel injector based on engine operating conditions and a stored injector table.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

As introduced above, fuel injectors may be actuated according to a fuel injector activation output, such as a fuel injector activation time (e.g., an opening duration), based on estimated and/or measured engine operating conditions and stored fuel injector activation data. In one example, the fuel injector activation data may be stored within the memory of the computer-readable storage medium of the controller within an injector table or map.

FIG. 3 shows two example injector tables. A first injector table 300 contains fuel injector activation data indexed in the memory by a pressure value, such as a fuel rail pressure (FRP). A second injector table 302 contains injector activation data indexed in the memory by a modified pressure value, which may be a modified pressure difference across an orifice of the nozzle of the injector. As explained further below, the modified pressure difference may be a function of a square root of a difference between a rail pressure and peak cylinder pressure, the peak cylinder pressure multiplied by a function of engine speed and injection timing, and the pressure difference offset by a correction factor. The second injector table 302 represents an example of an alternate method of indexing an injector table, discussed further below. The first injector table 300 represents an example of a standard method for indexing an injector table.

As shown in FIG. 3, the first injector table 300 includes a series of fuel rail pressure (FRP) values on the x-axis (e.g., horizontal axis) or first row 304 of the table. In one example, the series of fuel rail pressures may range from 600 to 2200 bar. In another example, the series of fuel rail pressures may range from 400 to 2800 bar. Further, the injector table 300 includes a series of fuel values on the y-axis (e.g., vertical axis) or first column 306 of the table. In one example, the series of fuel values may range from 0 to 3000 mm$^3$/stroke. In another example, the series of fuel values may range from 0 to a fuel value greater than 3000 mm$^3$/stroke. The above listed ranges for the series of fuel rail pressures and fuel values may change (e.g., be larger or smaller) based on the engine application and/or type of injector. The injector table 300 also includes a series of cells 308 containing fuel injector activation data. In one example, the fuel injector activation data may be fuel injector activation times (e.g., an injector open time or the amount of time the injectors are activated and injecting fuel into engine cylinders). In this example, each cell contains a fuel injector activation time which corresponds to one fuel rail pressure and one fuel value. In another example, the fuel injector activation data may be another fuel injection parameter.

The first injector table 300 may have a first number of columns and a second number of rows, both greater than 1. The first number and the second number may be a maximum number of rows and a maximum number of columns. In one example, the maximum number of rows and the maximum number of columns may not be the same. In another example, the maximum number of rows and the maximum number of columns may be less than 50. As such, the table may include a finite number of data points. For example, if the maximum number of rows is 10 and the maximum number of columns is 8, there may be 10 rows and 8 columns of fuel injector activation data. Specifically, there may be 8 fuel rail pressure values in the first row 304 and 10 fuel values in the first column 306. Thus, in this example, there are 80 fuel injector activation data points, or fuel injector activation times. In one example, the maximum number of columns and rows may be based on the available amount of memory or space within the computer readable medium of the controller. For example, as the number of data points, or columns and rows, increase, the amount of memory usage increases. Thus, the number of data points in the injector table may be limited by memory usage requirements.

The controller 106 is operable to generate a fuel injector activation output, such as a fuel injector activation time, using a fuel injector table stored in the controller memory, a determined pressure, and a fuel value. In one example, the determined pressure may be a measured fuel rail pressure measured using a pressure sensor in the CRS (e.g., using pressure sensor 130 shown in FIG. 1). In another example, the determined pressure may be a fuel rail pressure estimated from the pressure sensor and/or additional engine operating conditions. The fuel value may be a quantity of fuel injected by a single fuel injector stroke (also referred to as a fuel charge). In one example, the fuel value may be a pre-determined value for the engine. As such, the fuel value may be stored in the controller. In another example, the fuel value may be based on engine operating conditions such as torque demand. The controller may inject the desired amount of fuel at a given (e.g., determined) fuel rail pressure by activating the fuel injectors for a specific amount of time. This amount of time, or the injector activation time, may be determined from the data in the injector activation table.

Specifically, the controller may look up the determined or measured fuel rail pressure and the desired fuel value in the injector table. As discussed above, the injector activation table may have a finite number of data points. Since the injector table may have a maximum number of rows and columns, the exact determined fuel rail pressure and desired fuel value may not be included in the injector table. As a result, the engine controller may interpolate between data points, around the desired points, to determine the injector activation time.

In an alternate embodiment, if the determined fuel rail pressure and desired fuel value are outside of the ranges of values listed in the injector table, the controller may extrapolate using the closest data points within the injector table. As such, similar methods as presented below for injector map interpolation may be used for extrapolation to determine an injector activation time at the desired operating points.

The injector map interpolation may include a multi-step (e.g., two dimensional) linear interpolation. For a given fuel value and fuel rail pressure, four data points may be selected in the injector table. In one example, the given (e.g., determined) fuel rail pressure and fuel value may be 1100 bar and 75 mm$^3$/stroke, respectively. Referring to the first injector table 300, both these values are between two fuel values and two fuel rail pressures listed in the first injector table 300. As a result, the controller must perform a multi-step linear interpolation between the four closest data points (cells 314, 316, 318, and 320 in the table), each corresponding to a fuel rail pressure and fuel value either above or below the given values.

In another example, the given or desired fuel value may be listed in the injector table while the determined fuel rail pressure is not. In this example, a one-way linear interpolation may be performed by the controller between the two closest data points corresponding to a fuel rail pressure above and a fuel rail pressure below the measured fuel rail pressure, at the given fuel value. Specifically, this may include interpolating between a first fuel injection activation time corresponding to a first fuel rail pressure and the given fuel value and a second fuel injection activation time corresponding to a second fuel rail pressure and the given fuel value. The first fuel rail pressure may be greater than the determined fuel rail pressure while the second fuel rail pressure may be less than the determined fuel rail pressure.

However, linearly interpolating between available fuel rail pressure values and fuel values in the injector map may result in interpolation error. Specifically, indexing the injector map by fuel rail pressure, as shown in the first injector table 300, may result in a non-linear relationship between fuel injector activation data. Consequently, linearly interpolating non-linear data may result in interpolation inaccuracies, thereby increasing fuel injector activation time error. This may in turn decrease fuel consumption efficiency and increase emissions variation.

Alternatively, if mass flow rate is plotted against the square root of the fuel rail pressure, the resulting mass flow rate curve becomes more linear. Thus, in a look-up table which indexes injector activation data by a modified pressure difference across a nozzle orifice of the injector, which utilizes a square root function, fewer data points may be used while obtaining a similar level of accuracy. Storing fewer data points within the look-up table may decrease memory usage in the computer readable medium of the controller.

The accuracy of linearly interpolation increases as the relationship between selected variables becomes more linear. Thus, linearly interpolating mass flow rate vs. the square root of the modified pressure difference across the orifice of the injector decreases interpolation error over linearly interpolating mass flow rate vs. the fuel rail pressure. For these reasons, indexing an injector map by a square root of the modified pressure difference instead of indexing by fuel rail pressure alone may increase the accuracy in determining a fuel injector activation output variable (e.g., fuel injector activation time). This may in turn decrease fuel injector activation time error, thereby increasing fuel consumption efficiency and decreasing emissions variation.

Further, as introduced above, indexing fuel injector activation data by rail pressure alone (as shown in fuel injector table 200), or a pressure difference across an orifice of the nozzle of the injector alone (e.g., fuel rail pressure minus peak cylinder pressure), may result in errors at different operating conditions experienced by the engine, while the engine is operating. Since on-engine (e.g., during engine operation) pressure conditions around the nozzle orifice of the injector are more dynamic and generally not the same as pressure conditions around the same nozzle orifice on a test bench, from which the typical injector maps are created (such as map 300), the injector activation time looked up in a traditional table indexed by rail pressure alone may result in inaccurate injector activation times for the current engine operating conditions. As a result, engine performance may be degraded. Thus, the fuel injector data may instead be indexed by a modified pressure difference across an orifice of the injector, where the modified pressure difference is a function of a square root of a difference between a rail pressure and peak cylinder pressure, the peak cylinder pressure scaled (e.g., multiplied by) a function of engine speed and injection timing, and the pressure difference offset by a correction factor. This modified pressure difference function may account for changes in fuel rail supply pressure as well as the pressures in the engine cylinder as a function of injection timing, engine speed, injection length, dual fuel gas quantities in the cylinder (e.g., when the engine is a dual fuel engine combusting both diesel fuel and a secondary fuel, such as natural gas), and the like.

More specifically, during engine operation, changes in different injection parameters, such as changes in injection timing, cylinder pressure, multiple injections (e.g., main and post injection), duration of injection and/or duration between multiple injections, substitution ratio (e.g., amount of natural gas injected divided by total amount of gas injected including natural gas and diesel fuel), and diesel fuel quantity, result in changes to the pressure upstream of the injector nozzle (e.g., as estimated/indicated by injector accumulator pressure or rail pressure, in one example) and the pressure downstream of the injector nozzle (e.g., as estimated/indicated by in-cylinder pressure). As a result, the pressure difference across the orifice of the injector nozzle (e.g., the difference between the pressure upstream and the pressure downstream of the injector nozzle), which drives the fuel flow through the nozzle, changes for these varying injection parameters.

FIGS. 4-9 show changes in a pressure upstream of the injector nozzle (injector accumulator pressure, which may be estimated by and/or represent rail pressure, in one example) and a pressure downstream of the injector nozzle (cylinder pressure) compared to injector test bench data (used for traditional injector maps, such as map 300) and for different injection parameters. Specifically, each of FIGS. 4-9 include a first graph displaying injector accumulator pressure (e.g., rail pressure) on the y-axis and crank angle degrees (CAD) on the x-axis and a second graph displaying cylinder pressure (representing injector nozzle outlet pressure) on the y-axis and CAD on the x-axis. Each of the x-axes displays the timing for top-dead-center (TDC) in the cylinder cycle and additional timings which may represent times when fuel injection via the injector starts, stops, and the like.

Figure 4:
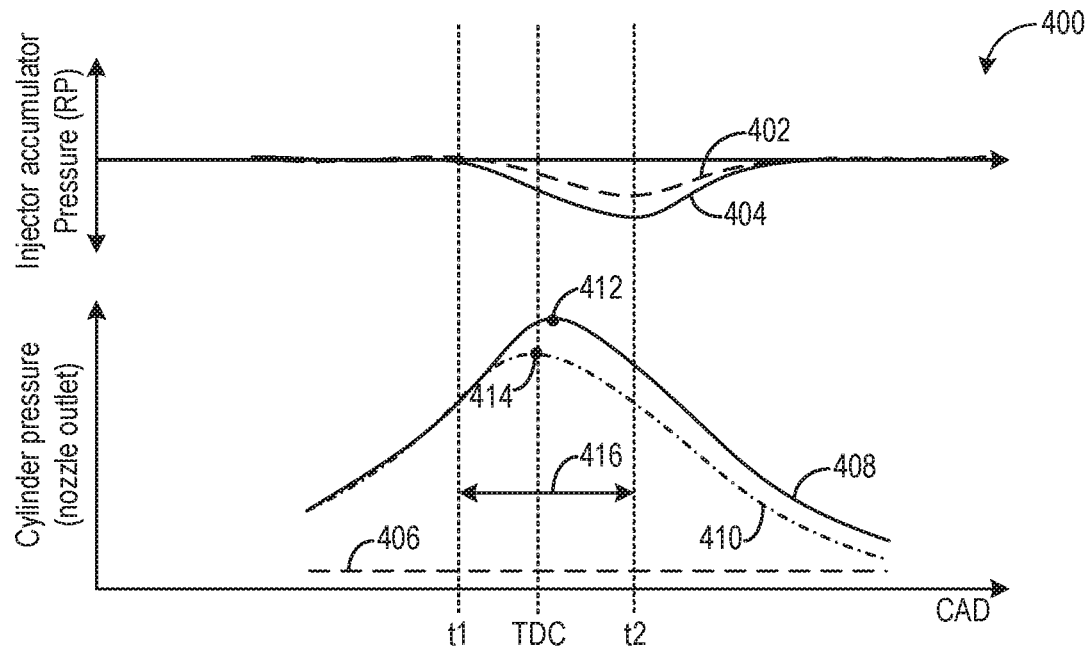
FIGS. 4-9 shows graphs of relationships between pressures upstream and downstream of an orifice of a nozzle of a fuel injector, and a time or crank angle in a cylinder cycle, for different engine operating conditions, according to an embodiment of the invention.

Turning first to FIG. 4, graph 400 shows a first plot 402 of injector accumulator pressure during an injection event of an injector on a test bench (e.g., during testing prior to being installed for use in an engine), a second plot 404 of injector accumulator pressure during an injection event on-board an engine (e.g., during engine operation in the field), a third plot 406 of nozzle outlet pressure during the injection event of the injector on the test bench, and a fourth plot 408 of nozzle outlet pressure (represented as engine cylinder pressure) during the injection event on-board the engine. While fourth plot 408 shows the total cylinder pressure during the entire combustion cycle, a fifth plot 410 shows a compression-only cylinder pressure during the injection event during the combustion cycle. The compression-only cylinder pressure shown in fifth plot 410 ignores the contribution of the combustion event to cylinder pressure, as combustion may occur sometime after the fuel injection. As shown in plots 402 and 404, the actual injector accumulator pressure during the injection event of the injector on-board the engine decreases by a greater amount than the injector accumulator pressure during the injection event of the injector on the test bench. Further, as shown in plots 406, 408, and 410, the nozzle outlet pressure (e.g., cylinder pressure) remains relatively constant on the test bench (plot 406), but increases by a larger amount to a peak value (peak cylinder pressure) and then decreases again during the injection event of the injector on-board the engine (plots 408 and 410). Peak cylinder pressure (PCP) for plot 408 is shown at 412 and PCP for plot 410 is shown at 414. These PCPs 412 and 414 are significantly higher than the steady-state nozzle outlet pressure seen on the test bench. The injection duration (e.g., the amount of time the nozzle of the injector is open and injecting fuel) for the injection occurs between time t1 and time t2, as indicated by injection duration 416. In this way, FIG. 4 shows the differences between injector accumulator pressure and nozzle outlet pressure experienced on-board the engine and on the test bench. As explained herein, injector activation data stored in an injector table generated from test bench data may not accurately represent the conditions occurring on-board the engine. Thus, using this test-bench derived injector activation data for commanding fuel injector activation times for injectors on-board an engine, during engine operation, may result in injecting a different amount of fuel than desired for the current engine operation conditions, thereby degrading engine efficiency and emissions.

Figure 5:
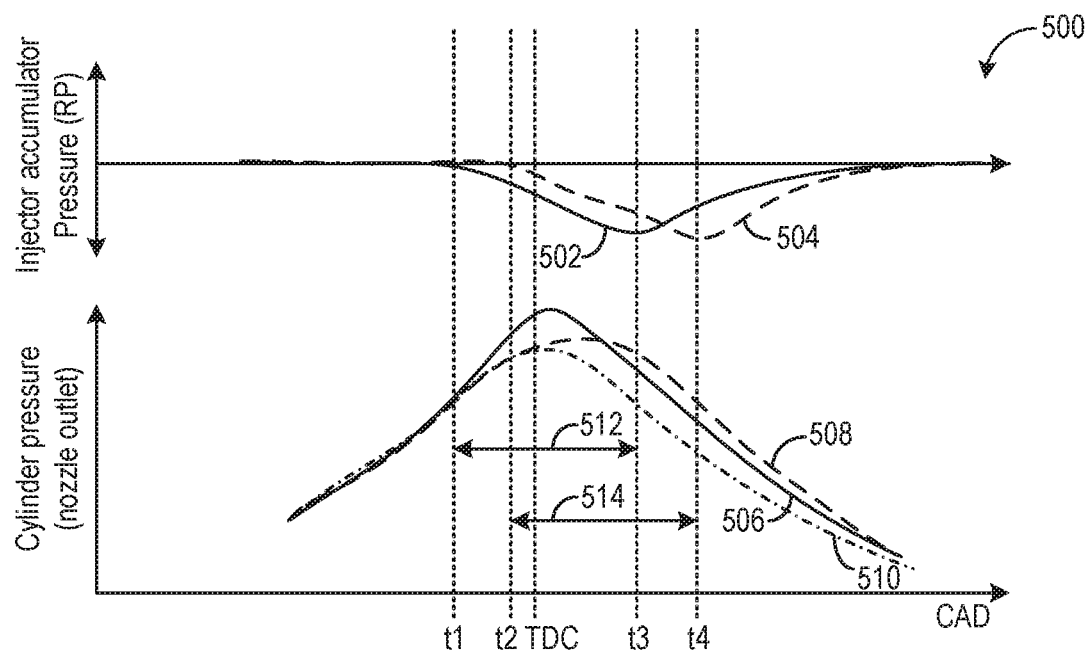

FIG. 5 shows a graph 500 including a first plot 502 of injector accumulator pressure during a first injection event during engine operation where injection time is more advanced, a second plot 504 of injector accumulator pressure during a second injection event during engine operation where injection timing is more retarded (e.g., retarded relative to the timing for the first injection event and/or relative to a standard injection timing), a third plot 506 of cylinder pressure during the first injection event at the more advanced timing, a fourth plot 508 of the second injection event at the more retarded timing, and a fifth plot 510 of the compression-only cylinder pressure during the first injection event. The injection duration of the first injection event at the more advanced timing is shown at 512 (between time t1 and time t3) and the injection duration of the second injection event at the more retarded timing is shown at 514 (between time t2 and time t4). The shapes (e.g., magnitude) of the injector accumulator pressure plots 502 and 504 are similar, however the injector accumulator pressure begins decreasing at an earlier time in the first plot 502 than in the second plot 504, due to the advanced timing of the first injection event. Additionally, the PCP of the cylinder pressure in the first injection event (plot 506), which occurs just after TDC, is greater than and occurs before the PCP of the cylinder pressure in the second injection event (plot 508), which occurs between TDC and time t3. In this way, changes in injection timing of an injector impacts the pressures upstream and downstream of the injector nozzle, thereby affecting the pressure difference across the orifice of the injector nozzle (and thus fuel flow through the nozzle). Therefore, as explained further below, the modified pressure difference function used in the injector table may be based at least partially on injection timing.

Figure 6:
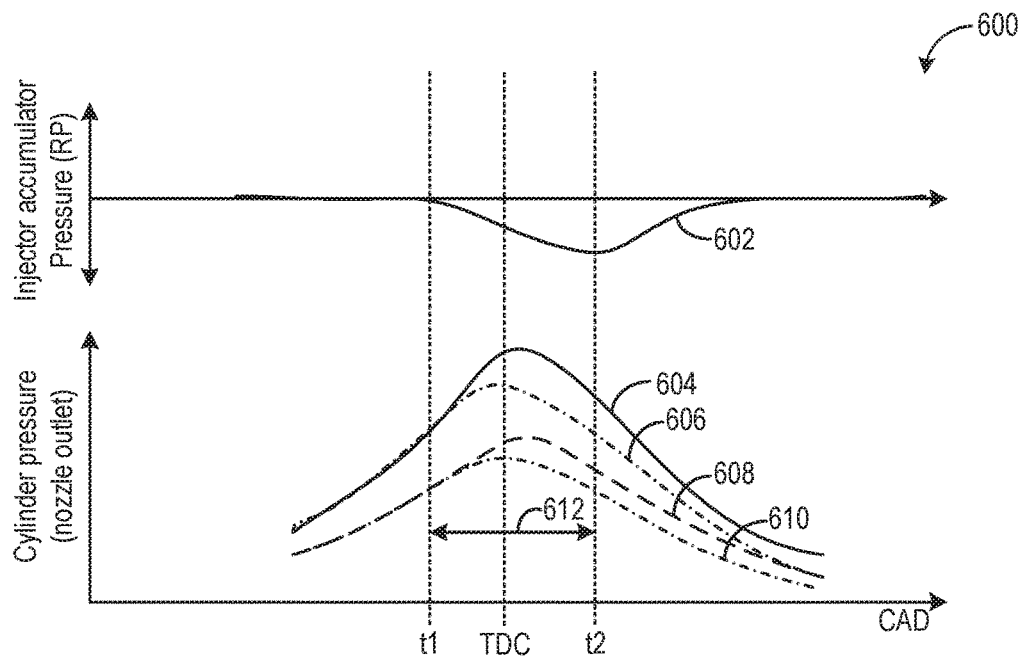

FIG. 6 shows a graph 600 including a first plot 602 of injector accumulator pressure during an injection event during engine operation, a second plot 604 of cylinder pressure during the injection event for a higher cylinder pressure (e.g., higher peak cylinder pressure), a third plot 606 of a corresponding compression-only cylinder pressure for the higher cylinder pressure, a fourth plot 608 of cylinder pressure during the injection event for a lower cylinder pressure (e.g., lower peak cylinder pressure), and a fifth plot 610 of a corresponding compression-only cylinder pressure for the lower cylinder pressure. The injection duration of the injection event is shown at 612, between times t1 and t2. The PCPs in both cylinder pressure conditions, for plots 604 and 608, occur just after TDC, but have different magnitudes. Different cylinder pressures may affect the overall pressure difference across the orifice of the injector nozzle, and thus fuel flow through the nozzle. As a result, for a same injector activation time (e.g., duration 612), different amounts of fuel may be injected into the cylinder due to differing pressure differences across the nozzle (due to the different in-cylinder pressures).

Figure 7:
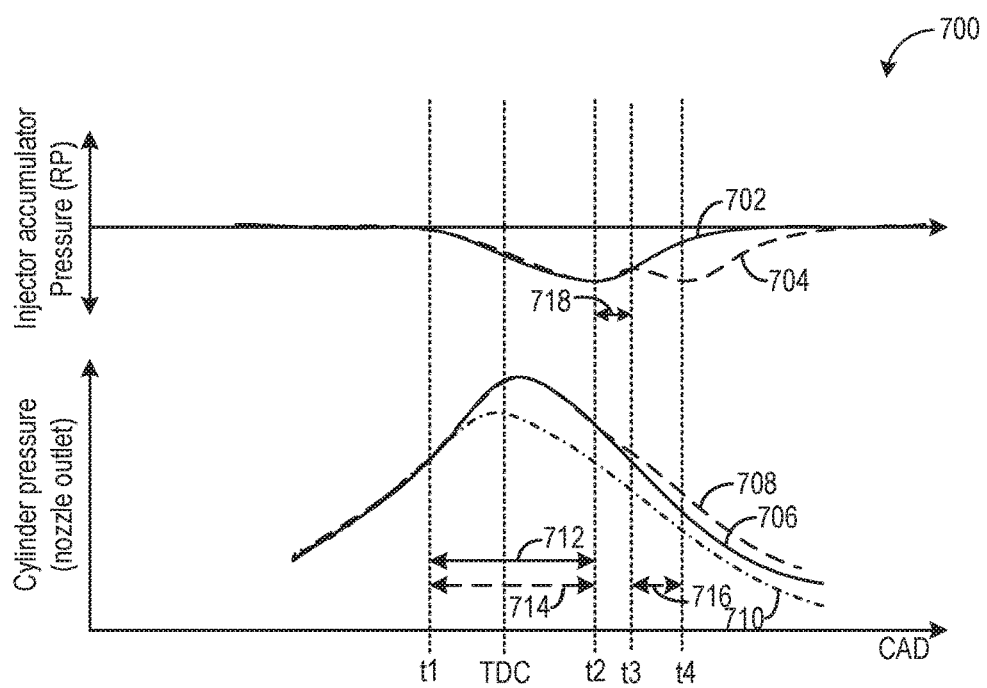

FIG. 7 shows a graph 700 showing differences in injector accumulator pressure and cylinder pressure for a single injection (e.g., only a main injection) vs. multiple injections (a main injection followed by a post injection). In particular graph 700 includes a first plot 702 of injector accumulator pressure during a first injection event including only a single injection, a second plot 704 of injector accumulator pressure during a second injection event including two injections (a main injection and post injection), a third plot 706 of cylinder pressure during the first injection event with the single injection, a fourth plot 708 of cylinder pressure during the second injection event including the two injections, and a fifth plot 710 of compression-only cylinder pressure for the first injection event. The injection duration of the single injection for the first injection event is shown at 712. The injection duration of the main injection (e.g., main injection duration) for the second injection event is shown at 714 and the injection duration of the post injection (e.g., post injection duration) for the second injection event is shown at 716. The time between the end of the main injection duration 714 and the beginning of the post injection duration 716 is referred to herein as the post-dwell time (or duration), as indicated at 718. Additionally, the main timing of the main injection is at time t1 and the post timing of the post injection is at time t3. As shown by plots 702 and 704, the injector accumulator pressure is similar for the main injections of both injection events; however, the post injection results in plot 704 having an additional dip in pressure before returning to a baseline level (due to the post injection). The in-cylinder pressure, during engine operation, for one injection (plot 706) vs. two injections (plot 708) are similar (e.g., have similar PCPs); however, the post injection results in a slower decrease in cylinder pressure after the PCP and a higher overall pressure after the main injection. In this way, different pressure differences across the orifice of the injector nozzle also occur due to the number of injections during an injection event (e.g., during a cylinder combustion cycle). As a result, fuel flow through the injector nozzle may change based on the number of injections.

Figure 8:
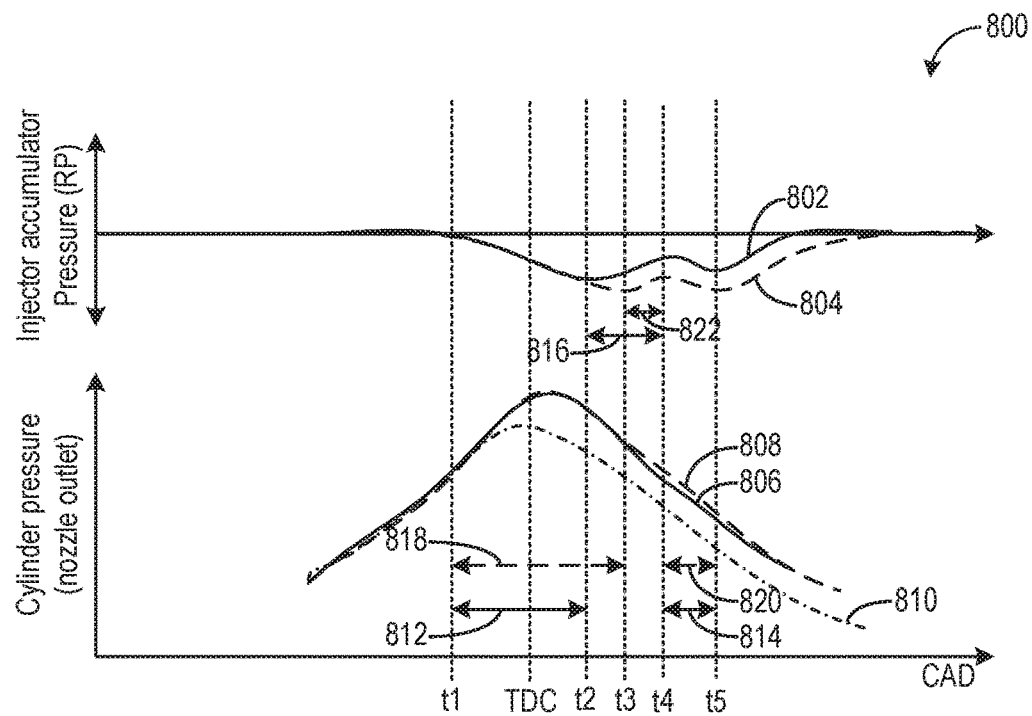

Fuel flow through the nozzle, and the overall amount of fuel injected, may also be affected by the duration of the main injection and post injection for a main/post injection event, as shown in FIG. 8. In particular, FIG. 8 shows a graph 800 including a first plot 802 of injector accumulator pressure and a third plot 806 of cylinder pressure for a first injection event having a shorter main injection 812 and longer dwell time 816 (as compared to the second injection event described below). Graph 800 further includes a second plot 804 of injector accumulator pressure and a fourth plot 808 of cylinder pressure for a second injection event having a longer main injection 818 and shorter dwell time 822. The post injection for the first injection event (shown at 814) and the post injection for the second injection event (shown at 820) both occur between times t4 and t5, at the conclusion of their respective dwell times. Graph 800 also includes a fifth plot 812 of compression-only pressure for the second injection event. As shown in FIG. 8, the injector accumulator pressure remains lower and is slower to increase back to baseline following the main injection for the second injection event having the longer main injection 818 (plot 804), as compared to the first injection event (plot 802). Additionally, the cylinder pressure is slightly higher for the second injection event (plot 808) than the first injection event (plot 806), following the conclusion of the main injection 808 for the second injection event. In this way, the duration of the main injection and post injection, as well as the timings of these injections including the dwell time, affect the pressure difference across the orifice of the injector nozzle. As a result, these injection parameters may also affect fuel flow through the nozzle during injection during engine operation.

As introduced above, in some embodiments, the engine may be a dual-fuel engine capable of injecting both liquid fuel (e.g., diesel fuel) via the fuel system including the injector and gaseous fuel (e.g., natural gas). A substitution ratio of gaseous fuel to total fuel (e.g., the amount of natural gas injected divided by the total amount of gas injected including natural gas and diesel fuel) may be adjusted during engine operation based on engine operating conditions. However, the substitution ratio may affect the fuel flow through the injector nozzle, and the overall amount of fuel (e.g., diesel fuel) injected into the cylinder, as shown in FIG. 9. Specifically, FIG. 9 shows a graph 900 including a first plot 902 of injector accumulator pressure, a second plot 906 of cylinder pressure, and a third plot 908 of compression-only cylinder pressure for an injection event (e.g., diesel fuel injection event) during engine operation with a first, lower substitution ratio (e.g., diesel fuel only and/or are larger quantity of diesel fuel than gaseous fuel). Graph 900 further includes a fourth plot 904 of injector accumulator pressure, a fifth plot 910 of cylinder pressure, and a sixth plot 912 of compression-only cylinder pressure for an injection event (e.g., diesel fuel injection event) during engine operation with a second, higher substitution ratio (e.g., smaller quantity of diesel fuel than gaseous fuel). The injection duration 914 for the injection event with the lower substitution ratio is longer than the injection duration 916 for the injection event with the higher substitution ratio since the diesel quantity is larger for the injection event with the lower substitution ratio (and thus the injection activation time is longer to inject the larger quantity of fuel). Due to the longer injection duration 914 and larger diesel quantity injected for the injection event with the first, lower substitution ratio, the injector accumulator pressure decreases by a greater amount and for a longer period (past time t3, as shown in plot 902) and the cylinder pressure has a higher PCP (plot 906) than for the injection event with the second, higher substitution ratio. In this way, the substitution ratio may affect the pressure difference across the orifice of the injector nozzle, and thus the fuel flow into the engine cylinder.

The pressure difference across the orifice of the injector nozzle may be modified, based on the relationships described above with references to FIGS. 4-9, in order to account for the injection parameters at different engine operating conditions. As a result, fuel flow model errors may be reduced and a more accurate injection activation time for the current operating conditions may be determined and used to actuate the fuel injectors. As a result, a desired amount of fuel may be injected into the engine cylinders and engine efficiency may be increased.

Returning to FIG. 3, an example of a second injector table 302 is shown which contains injector activation data indexed in the memory of the controller by a modified pressure difference across an orifice of the injector. In one example, the modified pressure difference is a function including a square root of a pressure difference across an orifice of the injector nozzle, an orifice outlet pressure scaled by a multiplier including a function of engine speed and injection timing, and a correction factor (e.g., offset) subtracted from the pressure difference. As explained further below, the pressure difference across the orifice may be estimated by a difference between a rail pressure (e.g., orifice inlet pressure) and peak cylinder pressure (PCP) (e.g., orifice outlet pressure). In one example, the PCP may be a pressure at the time of fuel injection. In some examples, fuel injection occurs within 20 degrees of top dead center in the engine cycle. As such, the cylinder firing pressure when fuel is injected into the engine cylinder may be a peak cylinder firing pressure. In another example, the peak cylinder pressure may be the peak cylinder pressure occurring during compression only. The modified pressure difference may be a determined value, continuously updated based on engine operating conditions. For example, the modified pressure difference may be determined based on a current measured or estimated engine operating parameters, as discussed further below.

The second injector table 302 may be generated and/or stored within the memory of the controller by transforming the first injector table 300 by a modified pressure difference function. In one example, the modified pressure difference function includes a square root approximation of a difference between a rail pressure and peak cylinder pressure, a function of engine speed and injection timing, and a correction factor. Specifically, in one example, the modified pressure difference function may be defined by the following formula:

$$MP = \sqrt{RP - PCP} * f1(engspeed, injtiming) - \theta 2(x),$$ (Equation 1)

wherein RP is the fuel rail pressure measured and/or estimated based on an output of a pressure sensor arranged in a fuel rail of the fuel system (e.g., sensor 130 shown in FIG. 1). This RP may be the same or similar to the injector accumulator pressure shown in FIGS. 4-9, as discussed above. The RP represents the orifice inlet pressure of the nozzle of the fuel injector, with any additional pressure drops between the injector nozzle orifice and the injector supply (e.g., fuel rail) being accounted for in the injector table values. The second term of Equation 1, which includes the multiplier or f1 term, is scaled by peak cylinder pressure (PCP), which may be modeled in one example, due to the assumption that fuel is generally injected in the vicinity of (e.g., at a similar crank shaft angle) as when the on-engine PCP occurs (as shown in FIGS. 4-9). The PCP may be modeled based on additional engine operating parameters including one or more of intake manifold pressure, engine speed, intake oxygen fraction, main injection timing, intake manifold temperature cylinder gas mass quantity (for a dual fuel engine), and/or fuel rail pressure. In one example, the PCP may be modeled based on measured intake manifold pressure, engine speed, intake oxygen fraction, main injection timing, and fuel rail pressure. In a second example, for a multi-fuel engine, the PCP may be modeled based on intake manifold pressure, engine speed, intake manifold temperature, cylinder gas mass quantity (mg per stroke), main injection timing, and fuel rail pressure. PCP may represent the injector nozzle orifice outlet pressure. The PCP term in Equation 1 is further corrected by a multiplier term, f1, which is a function of engine speed and diesel injection timing, since these engine operating parameters may further narrow down where on the cylinder pressure curve (on a crank angle basis) the fuel injection is occurring. The f1 term functions to correct the pressure downstream of the nozzle orifice. The f2 term may either be a constant value or a function of one or more other parameters (as explained further below) and functions to correct for both cylinder pressure impacts (which corrects for pressure downstream of the orifice) as well as effective rail accumulator differences on the bench (e.g., testing data) vs. on the engine (which corrects for pressure upstream of the orifice).

In one embodiment, the engine may operate with at least one main injection per cylinder cycle (e.g., combustion cycle of the cylinder). The engine may also operate with multiple injections in the same cylinder, such as a main injection and post injection (as shown in the examples presented in FIGS. 7 and 8). In this embodiment, the modified pressure equation of Equation 1 may be adapted to have the form shown in Equation 2 (for the main injection) and Equation 3 (for the post injection and any additional injections occurring after the first, main injection) below.

$$MP_{Main} = \sqrt{RP - PCP * f1(\text{eng speed, main timing}) - f2()} \quad \text{(Equation 2)}$$

$$MP_{Post} = \sqrt{\{RP + MD*C1 + PD*C2\} - PCP * f1(\text{eng speed, post timing}) - f2()} \quad \text{(Equation 3)}$$

In Equation 2, for the main injection of liquid (e.g., diesel) fuel, the PCP is the PCP for the entire cylinder cycle (not just during compression) and the multiplier in the second term (PCP term) is the function, f1, of engine speed and the commanded main diesel injection timing. The commanded main diesel injection timing may be the time, or crank angle, within the cylinder cycle that the main diesel injection begins (e.g., the crank angle, BTDC, at which the injector is activated to open and inject diesel fuel into the cylinder). In one embodiment, the multiplier term, f1(eng speed, main timing) may be determined based on a look-up table stored in memory of a controller of the engine. For example, the look-up table may include current engine speed and main injection timing of the diesel injection as inputs and the multiplier term f1, as the output. The offset value, f2, is a constant value that may correct for both cylinder pressure impacts as well as effective rail accumulator pressure differences on the bench vs. engine. Thus, the offset value, f2, may be predetermined and stored in memory of the controller.

In Equation 3, for the post injection of liquid (e.g., diesel) fuel, the multiplier in the second term is the function, f1, of engine speed and the commanded start of post diesel injection timing. The commanded start of post diesel injection timing may be the time, or crank angle, within the cylinder cycle that the post diesel injection begins (e.g., the crank angle, BTDC, at which the injector is activated to open and injects diesel fuel into the cylinder for the post injection). In one embodiment, the multiplier term, f1(eng speed, post timing) may be determined based on a look-up table stored in memory of the controller of the engine. For example, the look-up table may include current engine speed and post injection timing of the diesel injection as inputs and the multiplier term f1, as the output. The offset value, f2, may be the same as the offset value in Equation 2, as described above. Additionally, in Equation 3, the post injection modified pressure difference equation adjusts actual rail pressure, RP, to account for the observed decrease in fuel rail (e.g., supply) pressure based on how long the recent main inject occurred (referred to herein as pressure droop), and how long after the main injection event the post injection was commanded to begin (referred to herein as pressure recovery, or the post dwell time). In this way, the first term estimates what the effective rail pressure is at the beginning of the post injection, since the post injections' initial conditions are influenced by how much fuel the accumulator lost during the prior main injection. Thus, the first term in Equation 3 adds the duration of the main injection, MD, which is multiplied by a first constant C1, and adds the post dwell time (e.g., the time between the end of the main injection duration and the beginning of the post injection), which is multiplied by a second constant C2, to the rail pressure RP. The first constant C1 acts to estimate how much inlet pressure drooped during the main injection and the second constant C2 acts to estimate how much inlet pressure recovered during the dwell time between the main and post injections.

If the engine performs more than two injections in a single cylinder cycle, Equation 3 may be used for all subsequent post injections, using the timing for the post timing for the current post injection.

In yet another embodiment, the engine may be a multi-fuel engine that is adapted to combust at least two fuels, including a liquid fuel (e.g., diesel fuel) and gaseous fuel (e.g., natural gas). The diesel fuel may be injected via the injector for which the equations and injector maps discussed herein are used and the gaseous fuel may be injected via another injector or gas admission valve. As discussed above, during engine operation, the substitution ratio (SR) of gaseous fuel to total fuel (liquid+gaseous fuel) may be adjusted based on engine operating conditions. In some embodiments, as much gaseous fuel as possible may be used, while maintaining efficient engine operation. Under other engine operating conditions, only diesel fuel may be injected (and no gaseous fuel). In this embodiment of the multi-fuel (e.g., dual fuel) engine, the modified pressure equation of Equation 1 may be adapted to have the form shown in Equation 4 (for the main injection, which may be the only liquid fuel injection for the cylinder cycle) below.

$$MP_{Main,DF} = \sqrt{RP - PCP_{CO} * f1(eng\ speed, diesel\ timing) - f2(CGQ, CDQ)}$$ (Equation 4)

In the above equation, the $PCP_{CO}$ is the compression-only contribution of the modeled PCP discussed above. In one embodiment, the PCP model may include a compression only term in addition to an adder term for when combustion raises the PCP above the compression only term (e.g., compression only cylinder pressure may be modeled separately from additional combustion cylinder pressure). Thus, the $PCP_{CO}$ may be taken from the compression only term of the modeled PCP. As discussed above with reference to Equation 2, the PCP term is corrected by a function, f1, of engine speed and (main) diesel injection timing. As explained above, the f1 term may be looked up in a look-up table stored in memory of the controller with engine speed and commanded diesel injection timing (e.g., crank angle degrees before TDC) as the inputs. The offset, f2, is not a constant value in Equation 4, and instead is a function of commanded gaseous fuel quantity, CGQ, (e.g., mg/stroke) and commanded diesel fuel quantity, CDQ, (e.g., $mm^3$/stroke). In one embodiment, the offset term f2 may be looked up, during engine operation by the controller, in a look-up table stored in memory of the controller with CGQ and CDQ as the inputs. The f2 term corrects for bench vs. on-engine differences upstream of the nozzle orifice as well as downstream of the nozzle orifice. Upstream, the impact is that a high substitution ratio results in lower diesel quantities and therefore smaller accumulator driven pressure droops compared to the injector test bench data. Downstream, the impact is that differing gas substitution ratios (e.g., differing quantities of gas and/or diesel in combination) have an impact on the combustion profile and heat release rate on a crank angle basis. For example, the cylinder pressure profile for dual fuel combustion may be different than the cylinder pressure profile for diesel only combustion. Thus, the downstream orifice pressure should be compensated accordingly, as shown in Equation 4 above. In some embodiments, the f2 term in Equations 2 and 3 may be a function of diesel quantity instead of a constant value.

Returning to FIG. 3, the fuel rail pressures listed in the first row 304 of the first injector table 300 may be input into the modified pressure difference function (e.g., one of Equations 1-4 presented above) to determine a set of modified pressure difference values. These modified pressure difference values, which may be outputs of one of Equations 1-4, are shown in the first row 310 of the second injector table 302. As such, the first row 310 includes a range of modified pressure difference values corresponding to a range of fuel rail pressures. In the first row 310, F, represents the remaining terms in the modified pressure difference equation (e.g., in addition to RP). As discussed above, in one example, the range of fuel rail pressures may vary from 600 to 2200 bar. The same injector activation data at the same fuel values as in the first injector table 300 is now in the second injector table 302. For example, the same range of fuel values as discussed above are listed in a first column 312 of the second injector table 312. However, now the injector activation data is indexed by the modified pressure difference in the second injector table 302, rather than the fuel rail pressure alone.

As explained above, adjusting data in the fuel injector table by the terms in the modified pressure difference function(s) described herein corrects for differences between pre-determined injector activation data and actual engine operating conditions. For example, an injector table (such as the first injector table 300) may be created during bench-top testing using a test stand instead of the actual engine in which the injector table is used. As such, the test stand may not exhibit the same pressure drop behavior across the orifice of the nozzle of the fuel injector as in the operating engine. Additionally, the test stand may not have the same back-pressure or cylinder pressure (e.g., peak cylinder pressure) as the operating engine. Thus, the modified pressure difference equation terms (discussed above with reference to Equations 1-4) may compensate for all of the pressure-related differences between the operating engine and the equipment used to create the injector table. This engine-specific correction allows the same injector map to be used in a plurality of different engines. Further, the correction factor may change based on a current engine operating condition, thereby increasing the accuracy of the injector table in a given engine as engine system variables change.

The transformation in the injector table index by the square root function causes the fuel injector activation data stored in the second injector table 302 to be more linear than the fuel injector activation data stored in the first injector table 300. Consequently, linear interpolation between data in the second injector table 302 may result in less error in the resulting fuel injector activation output (e.g., fuel injector activation time). Since linear interpolation accuracy may be increased with indexing the fuel injector activation data by the modified pressure difference, less data points may result in the same amount of accuracy. As such, the size of the injector table stored in the controller memory may be reduced, thereby decreasing memory usage.

When indexing the injector table by the modified pressure difference, the input to the injector table must also be transformed by the modified pressure difference function. Thus, in Equations 1-4 above, the RP may be a determined fuel rail pressure. In one example, the determined fuel rail pressure may be measured by a pressure sensor, such as the pressure sensor 130 shown in FIG. 1, upstream of the fuel injectors. As such, a modified pressure difference is determined by inputting the determined fuel rail pressure, and the additionally required engine operating parameters, into the modified pressure function. The determined modified pressure, as well as the additional engine operating parameters (e.g., engine speed, injection timing, and the like) may then be used as the inputs into the indexed injector table to interpolate among the nearest indexed fuel injector activation data to determine a fuel injector activation output, such as a fuel injector activation time.

As discussed above, the fuel injector activation output may be used to control fuel injection of the engine system. Thus, the technical effect of the indexing and interpolating method described above (and further expanded upon below with reference to FIG. 5), it to increase the accuracy of fuel injector control. Specifically, by indexing an injector activation table by a modified pressure difference, the controller may determine a more accurate fuel injection activation time for the determined fuel rail pressure and desired fuel value. As such, injection timing may be adjusted based on the determined fuel injector activation time to deliver the desired amount of fuel. Delivering the accurate amount of fuel may increase fuel consumption efficiency of the engine while also decreasing engine emissions variation. Additionally, for multi-fuel engines, by using the multi-fuel modified pressure difference equation (Equation 4) for injector control, higher natural gas substitution ratios may be used while maintaining efficient and reliable engine operation. In this way, the approach described above and further below provides for reduced engineering time and increased cost savings.

In some implementations, the computer-readable storage medium 138 has memory with one or more sets of instructions and/or data stored thereon that when accessed and executed by an electronic device (e.g., processor unit 136) cause the electronic device to perform various actions. Specifically, the computer-readable storage medium with memory may include fuel injector activation data indexed in the memory by an input parameter, instructions for determining a modified pressure difference value based on a determined pressure, current engine operating conditions, and a modified pressure difference function, and instructions for generating a fuel injector activation output by interpolating among the indexed fuel injector activation data with the modified pressure difference value as the input parameter. In one example, the determined pressure is a measured fuel rail pressure, the measured fuel rail pressure measured upstream of a fuel injector, and the modified pressure difference function includes a square root approximation.

In one embodiment, the fuel injector activation data may be stored in an injector table, the injector table having a first number of columns and a second number of rows, both greater than one. A first row of the second number of rows includes a range of modified pressure difference values corresponding to a range of fuel rail pressures and a first column of the first number of columns includes a range of fuel values, the range of fuel values including a range of quantities of fuel injected by a single fuel injector. Further, each cell in the injector table includes a fuel injector activation time corresponding to one of the modified pressure values in the range of modified pressure values and one of the fuel values in the range of fuel values.

The modified pressure difference values may be determined based on one or more equations or one or more tables stored in memory of the controller. For example, the modified pressure difference values may be calculated by the controller according to a stored modified pressure difference function (e.g., one of Equations 1-4) and measured and/or estimated engine operating conditions. In another example, the modified pressure difference values may be looked up in the memory of the controller using one or more stored look-up tables that use the operating parameters of the modified pressure difference equation as inputs.

The modified pressure function transforms the fuel injector activation data stored in the injector table to be more linear between cells of the injector table. The computer-readable storage medium further includes instructions for performing a multi-step linear interpolation between indexed fuel injector activation data in the injector table to determine a fuel injector activation time at the determined pressure difference and fuel value. Additionally, the computer-readable storage medium includes instructions for outputting the determined fuel injector activation time and adjusting fuel injection based on the determined fuel injector activation time. In one example, adjusting fuel injection includes adjusting an injector open time.

Further, the system of FIG. 1 provides for a fuel rail system comprising a common fuel rail, a plurality of fuel injectors operable to inject fuel from the common fuel rail to cylinders of an engine, an injector table stored within a computer memory, and a controller operable to adjust fuel injection to the cylinders based on a fuel injector activation time, the fuel injector activation time determined by indexing injector data stored in the injector table by a modified pressure difference function, the modified pressure difference function including a square root of a rail pressure offset by a peak pressure in the cylinders, multiplied by a function of engine speed and injection timing, and further offset by a correction term that corrects for pressure differences between engine and bench injector data both upstream and downstream of the nozzle orifice of the injector, and interpolating the indexed injector data based on a determined fuel rail pressure, a quantity of fuel injected by a single fuel injector stroke, and additional engine operating conditions. In one example, the determined fuel rail pressure is measured from one or more pressure signals sent to the controller by at least one pressure sensor positioned upstream of the common fuel rail.

In another embodiment of the invention, the system of FIG. 1 provides for a fuel rail system comprising a common fuel rail, a plurality of fuel injectors operable to inject fuel from the common fuel rail to cylinders of an engine, a non-transitory computer readable storage medium with memory, wherein an injector table is stored within the memory, and wherein the injector table comprises injector data indexed according to a modified pressure difference function, and a controller operable to control the fuel injectors based on a fuel injector activation time, wherein the controller is configured to determine the fuel injector activation time by interpolating the indexed injector data based on a determined fuel rail pressure and a quantity of fuel injected by a single fuel injector stroke. The modified pressure function includes a square root of a fuel rail pressure offset by a peak pressure in the cylinders and an additional correction term including a constant value or a function of quantities of liquid fuel and gaseous fuel injected into the engine. Further, the determined fuel rail pressure may be measured from one or more pressure signals sent to the controller by at least one pressure sensor positioned upstream of the common fuel rail.

In one embodiment, a line of engines may include a plurality of different engines and/or engine types. All of the engines in the line of engines may have the same fuel injectors. Additionally, the same fuel injector activation data may be stored in a fuel injector table within a memory of a computer-readable storage medium in each engine. As such, each engine may have a common fuel injector table. However, the plurality of engines in the line of engines may have different peak cylinder pressures, injection timings, and/or gaseous fuel substitution ratios. As described above, the data stored in the common fuel injector table may be indexed by a modified pressure difference function including a square root of a rail pressure offset by the peak cylinder pressure, scaled by a function of engine speed and injection timing, and further offset by a correction factor for pressures upstream and downstream of the injector nozzle orifice. The peak cylinder pressure for each engine may be individually stored within the memory of the corresponding engine and/or determined based on a model of peak cylinder pressure specific to the individual engine. As such, upon indexing the data in the common fuel injector table, an engine controller may input the stored or modeled peak cylinder pressure, as well as additional operating conditions of the engine, into the modified pressure function and then index the stored fuel injector activation data. In this way, the same fuel injector activation table may be stored in multiple engines and/or engine types and used to determine fuel injector activation times with increased accuracy. In some embodiments, difference modified pressure functions may be used in different functions, while still using the same fuel injector activation table. For example, the modified pressure difference equation presented in Equation 4 above may be used in a multi-fuel engine while the modified pressure difference equations presented in Equations 2 and 3 may be used in a liquid fuel only engine which operates with multiple injections in each cylinder cycle.

In one example, the line of engines may include a first engine and a second engine, both engines having the same fuel injectors. The first engine may include a first injector table stored in a first computer memory and the second engine may include a second fuel injector table stored in a second computer memory, the first injector table and the second injector table being the same. Further, the first engine may have a first peak cylinder pressure and the second engine may have a second peak cylinder pressure, the first peak cylinder pressure being different than the second peak cylinder pressure. A first controller included in the first engine may then index injector data stored within the first injector table by a modified pressure difference function, the modified pressure difference function including a square root of a fuel rail pressure offset by the first peak cylinder pressure, scaled by a multiplier that is a function of engine speed and injection timing, and a correction factor term. Similarly, a second controller included in the second engine may index injector data stored within the second injector table by the same modified pressure difference function but offset by the second peak cylinder pressure, scaled by a multiplier that is a function of engine speed and injection timing, and the correction factor term.

Turning now to FIG. 10, an embodiment of a method 1000 is shown for determining a fuel injector activation output, such as a fuel injector activation time, and adjusting fuel injection to the engine based on the determined fuel injector activation output. In one example, the method 1000 is executable by the controller 106 shown in FIG. 1, according to instructions stored on memory of the controller. In particular, the controller 106 executes the method 1000 repeatedly throughout engine operation to determine an injector activation time.

The method 1000 begins at 1002 by estimating and/or measuring engine operating conditions. Engine operating conditions may include engine speed and load, pressures in the fuel rail system, engine cylinder pressures, torque demand, boost pressure, injection timing of the injector(s), a substitution ratio of gaseous fuel to total fuel, a commanded liquid fuel quantity, a commanded gaseous fuel quantity, or the like. Specifically, estimating and/or measuring engine operating conditions at 1002 may include determining a fuel rail pressure. As discussed above, in one example, the fuel rail pressure may be determined based on the output of a pressure sensor (such as pressure sensor 130 in FIG. 1) positioned in the fuel rail system, upstream of a fuel injector and/or the common fuel rail. Estimating and/or measuring engine operating conditions at 1002 may further include determining a commanded injection timing, engine speed, and a commanded diesel and/or gaseous fuel quantity. For example, the method at 1002 may include determining the engine operating conditions (e.g., parameters) using in the modified pressure difference function, such as one or more of Equations 1-4 presented above.

At 1004, the method includes obtaining a fuel value. In one example, a fuel value for all engine operating points may be stored in the controller memory. In another example, the fuel value may be estimated based on engine operating conditions such as torque demand. Continuing to 1006, the method includes determining the desired modified pressure difference function for indexing the fuel injector activation data. In one example, the desired modified pressure difference function may be predetermined and stored within the controller based on the engine type (e.g., multi-fuel vs. single fuel) and/or whether or not multiple injections (e.g., main and post injections) are used during a single cylinder cycle. For example, one or more of Equations 1-4 presented above may be stored in the memory of the controller and the controller may select the desired equation or combination of equations to use as the modified pressure difference function, based on the engine type and/or types of injections or fuels used in the engine.

The method then continues to 1008 to insert the determined fuel rail pressure and additional engine operating conditions into the selected (or predetermined) modified pressure difference function to determine the modified pressure difference value. Specifically, at 1008 the controller inputs the determined fuel rail pressure and additional engine operating conditions (e.g., engine speed, injection timing, time between multiple injections, and/or commanded liquid fuel and/or gaseous fuel quantities) into the modified pressure difference function. In one example, the modified pressure difference function is one or more of the function represented by Equations 1-4 above. As explained above, the modified pressure difference function may be a square root approximation. In alternate examples, the modified pressure function may a different function close to the square root function. For example, the fuel rail pressure minus the PCP term minus the f2 term of the modified pressure difference function may be raised to the 0.45 power rather than 0.5.

Once the controller determines the modified pressure difference value at 1008, the method continues to 1010 to index the fuel injector activation data as a function of the modified pressure difference function. As described above, the fuel injector activation data may be stored in an injector table, such as the injector table 300 presented at FIG. 3. The injector table may further be stored in a non-transitory computer readable storage medium with memory. As such, the controller may actively index the data in the stored injector table by the modified pressure difference function during engine operation when determining fuel injection command values. In one example, the modified pressure difference function for indexing the fuel injector activation data is the same as the modified pressure difference function for determining the modified pressure difference at 1006. Thus, the resulting output from indexing the stored fuel injector activation data during engine operation may be a modified injector table indexed by the modified pressure difference (instead of fuel rail pressure alone or based on a pressure difference across the injector nozzle orifice alone). An example of the modified injector table is the second injector table 302 presented at FIG. 3. In one example, the modified injector table may then be stored in within the memory. The method then continues on to 1012 to look up the fuel value (obtained at 1004) and the modified pressure difference in the modified injector table.

At 1014, the controller interpolates the indexed injector activation data in the modified injector table to determine an injector activation time for the determined modified pressure difference and fuel value. The method at 1014 may include determining the injector activation data points within the injector table that are around the given modified pressure difference and fuel value. For example, the controller may locate a first modified pressure difference value above the determined modified pressure difference and a second modified pressure difference value below the determined modified pressure difference. The first and second modified pressure difference values are two modified pressure difference values out of the plurality of modified pressure difference values listed in the first row of the injector table (such as the first row 310 in the second injector table 302). Then, the controller may locate a first fuel value above the selected fuel value and a second fuel value below the selected fuel value. The first and second fuel values are two fuel values out of the plurality of fuel values listed in the first column of the injector table (such as the first column 312 in the second injector table 302). The cells in the injector table (containing injector activation data or times) that correspond to the first and second modified pressure difference values and the first and second fuel values are then selected. The controller then interpolates among the selected data points to determine the fuel injector activation time for the determined modified pressure difference and fuel value.

At 1016, the controller outputs the determined injector activation time. Then, at 1018, the controller adjusts fuel injection based on the determined injector activation time. As discussed above, adjusting fuel injection may include adjusting the fuel injection timing of one or more fuel injectors. Specifically, in one example, the controller may adjust a pulse width modulation signal to command the fuel injectors to inject fuel for a duration. The duration may be based on the fuel injector activation time. As such, the fuel injector activation time may be an amount of time the fuel injectors are open and injecting fuel into the engine cylinders.

In this way, a controller in an engine may index fuel injector activation data in a computer memory as a function of a modified pressure difference function, linearly interpolate among the indexed injector activation data to determine an injector activation time at a determined fuel rail pressure based on the modified pressure difference function, and adjust fuel injection of the engine based on the injector activation time. In one example, adjusting fuel injection includes adjusting a pulse width of one or more fuel injectors, the pulse width increasing as the injector activation time increases. Further, the controller may inject fuel within 20 degrees of top dead center at a cylinder pressure. In one example, indexing fuel injector activation data includes indexing stored fuel injector activation data by a square root of a modified pressure difference across an orifice of the nozzle of the fuel injector, where the stored fuel injector activation data is stored in the computer memory of multiple engines utilizing the same fuel injectors. The modified pressure difference function may scale an outlet pressure of the nozzle outlet by a function of engine speed and injection timing and offset the pressure difference by an additional correction factor that corrects for pressure differences between actual, on-engine pressure values and pressure values seen during benchtop testing of an injector (off-board the engine). In alternate embodiments, the additional correction factor may be a function of the quantities of liquid fuel (e.g., diesel fuel) and gaseous fuel injected into the engine of a multi-fuel engine. Further, the controller may linearly interpolate between a first indexed fuel injector activation time and a second indexed fuel injector activation time based on a fuel value and a modified pressure difference, wherein the modified pressure difference is a square root of the pressure difference across the injector nozzle orifice less the additional correction factor and the outlet pressure of the orifice multiplied by a function of engine speed and injection timing. As explained above, indexing the injector table by a modified pressure difference (e.g., based on the modified pressure difference function) transforms the fuel injector activation data stored in the injector table to be more linear between cells of the injector table and to account for differences in pressures that occur on-board the engine, during different engine operating conditions. As a result, interpolation error may be reduced, thereby increasing the accuracy of the fuel injector activation time output by the controller. Further, more accurate injector activation times may be determined for the current engine operating conditions. Consequently, the accuracy of fuel injector control may be increased, thereby increasing fuel consumption efficiency of the engine while also reducing engine emissions variation.

In an embodiment, a system includes an engine, a fuel injector, and a controller having one or more processors. The controller is configured to determine a modified pressure difference value across a nozzle orifice of the fuel injector based on determined pressures upstream and downstream of the nozzle orifice, an engine speed of the engine, injection timing, and a modified pressure difference function. The controller is further configured to generate a fuel injector activation output by interpolating among indexed fuel injector activation data with the modified pressure difference value as a first input parameter; the fuel injector activation data is indexed according to the first input parameter and a second input parameter. For example, according to one aspect the second input parameter may be a fuel value; the fuel value includes a quantity of fuel injected by a single fuel injector stroke of the injector.

In an embodiment, a system includes an engine, a fuel injector, and a controller having one or more processors. The controller is configured to control fuel injection by activating the injector for a determined activation time. The controller is configured to determine the activation time based on a commanded fuel value and a function of a modified pressure difference across an orifice of a nozzle of the injector. The modified pressure difference is based on a difference between a rail pressure and peak cylinder pressure, where the peak cylinder pressure is scaled by a function of engine speed and injection timing and the pressure difference offset by a correction factor.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable storage medium with memory, comprising:
   fuel injector activation data indexed in the memory according to two input parameters;
   instructions for determining a modified pressure difference value across a nozzle orifice of a fuel injector based on determined pressures upstream and downstream of the nozzle orifice, engine speed, injection timing, and a modified pressure difference function; and
   instructions for generating a fuel injector activation output by interpolating among the indexed fuel injector activation data with the modified pressure difference value as a first of the two input parameters.

2. The medium of claim 1, wherein the determined pressures upstream and downstream of the nozzle orifice include a measured fuel rail pressure, the measured fuel rail pressure measured upstream of the fuel injector, and a modeled peak cylinder pressure.

3. The medium of claim 2, wherein the measured fuel rail pressure is a liquid fuel rail pressure of liquid fuel injected into an engine via the fuel injector.

4. The medium of claim 1, wherein the modified pressure difference function is a square root approximation of a pressure difference between a pressure upstream and a pressure downstream of the nozzle orifice offset by a correction factor, the pressure downstream of the nozzle orifice scaled by a function of engine speed and injection timing, where the square root approximation linearizes the fuel injector activation data stored within one injector map in the memory.

5. The medium of claim 1, wherein a second of the two input parameters is a fuel value, wherein interpolating among the indexed fuel injector activation data is further based on the fuel value, the fuel value including a quantity of fuel injected by a single fuel injector stroke of the fuel injector, and wherein the fuel injector activation data is stored in the memory in one injector table, the one injector table having a first number of columns and a second number of rows, both greater than one.

6. The medium of claim 5, wherein a first row of the second number of rows includes a range of modified pressure difference values corresponding to a range of fuel rail pressures and a first column of the first number of columns includes a range of fuel values, the range of fuel values including a range of quantities of fuel injected by a single fuel injector and wherein each cell in the one injector table includes a fuel injector activation time corresponding to one modified pressure difference value in the range of modified pressure difference values and one of the fuel values in the range of fuel values.

7. The medium of claim 5, wherein the modified pressure difference function transforms the fuel injector activation data stored in the one injector table to be more linear between cells of the one injector table.

8. The medium of claim 5, wherein the instructions for generating the fuel injector activation output by interpolating among the indexed fuel injector activation data include instructions for performing a multi-step linear interpolation between the indexed fuel injector activation data in the one injector table to determine a fuel injector activation time at a determined pressure difference and fuel value.

9. The medium of claim 8, further comprising instructions for outputting the determined fuel injector activation time and adjusting fuel injection based on the determined fuel injector activation time.

10. The medium of claim 9, wherein adjusting fuel injection includes adjusting an injector open time.

11. A method for an engine, comprising:
    injecting fuel via activating an injector for an activation time, the activation time determined based on a commanded fuel value and a function of a modified pressure difference across an orifice of a nozzle of the injector, where the modified pressure difference is based on a difference between a rail pressure and a peak cylinder pressure, the peak cylinder pressure scaled by a function of engine speed and injection timing and the difference between the rail pressure and the peak cylinder pressure offset by a correction factor.

12. The method of claim 11, wherein the correction factor is a value or function that corrects for differences in pressures upstream and downstream of the orifice between operation of the injector on-board the engine and operation of the injector during bench-top testing off-board the engine.

13. The method of claim 12, wherein the fuel injected via the injector is liquid fuel, wherein the correction factor is the function which is a function of a commanded quantity of gaseous fuel to be injected by a gas admission valve or gas injector and a commanded quantity of liquid fuel to be injected by the injector, and wherein the engine is a multi-fuel engine.

14. The method of claim 13, wherein the injection timing is a timing of injection of the liquid fuel and wherein the function of the modified pressure difference across the orifice is a square root approximation.

15. The method of claim 11, wherein the injection timing is a main timing of a main injection out of multiple injections during a same cylinder cycle.

16. The method of claim 11, wherein the injection timing is a post timing of a post injection out of multiple injections during a same cylinder cycle, the post injection occurring after a main injection.

17. The method of claim 16, wherein the difference between the rail pressure and peak cylinder pressure includes a difference between a sum of the rail pressure, a first duration of the main injection scaled by a first constant, and a second duration of the post injection scaled by a second constant.

18. The method of claim 11, wherein the peak cylinder pressure is the peak cylinder pressure occurring during compression only.

19. A fuel rail system, comprising:
a common fuel rail;
a plurality of fuel injectors operable to inject liquid fuel from the common fuel rail to cylinders of an engine;
a non-transitory computer readable storage medium with memory, wherein one injector table is stored within the memory, and wherein the one injector table comprises injector data indexed according to a modified pressure difference function that creates a more linear relationship between the injector data within the one injector table, where the modified pressure difference function is a function of each of a pressure difference across an orifice of a nozzle of the plurality of fuel injectors, engine speed, and injection timing; and
a controller operable to control the fuel injectors based on a fuel injector activation time, wherein the controller is configured to determine the fuel injector activation time by interpolating the indexed injector data within the one injector table based on a determined fuel rail pressure and a quantity of fuel injected by a single fuel injector stroke.

20. The system of claim 19, wherein the modified pressure difference function includes a square root of a difference between a determined fuel rail pressure and a modeled peak cylinder pressure, the difference offset by a correction factor and the modeled peak cylinder pressure multiplied by a function of engine speed and injection timing and wherein the determined fuel rail pressure is measured from one or more pressure signals sent to the controller by at least one pressure sensor positioned upstream of the common fuel rail.

* * * * *